US007386175B2

(12) United States Patent
Hara et al.

(10) Patent No.: US 7,386,175 B2
(45) Date of Patent: Jun. 10, 2008

(54) MODIFYING WAVELET DIVISION LEVEL BEFORE TRANSMITTING DATA STREAM

(75) Inventors: Junichi Hara, Kanagawa (JP); Toshio Miyazawa, Kanagawa (JP); Yasuyuki Nomizu, Kanagawa (JP); Hiroyuki Sakuyama, Tokyo (JP); Nekka Matsuura, Kanagawa (JP); Takanori Yano, Kanagawa (JP); Taku Kodama, Kanagawa (JP); Yasuyuki Shinkai, Kanagawa (JP); Takayuki Nishimura, Tottori (JP)

(73) Assignee: Ricoh Company, Ltd., Tokyo (JP)

( * ) Notice: Subject to any disclaimer, the term of this patent is extended or adjusted under 35 U.S.C. 154(b) by 514 days.

(21) Appl. No.: 10/691,623

(22) Filed: Oct. 24, 2003

(65) Prior Publication Data

US 2004/0141651 A1 Jul. 22, 2004

(30) Foreign Application Priority Data

Oct. 25, 2002 (JP) .............................. 2002-310506

(51) Int. Cl.
*G06K 9/36* (2006.01)
(52) U.S. Cl. ....................... 382/232; 382/240; 382/305
(58) Field of Classification Search ................ 382/232, 382/240, 305, 299; 709/209, 203; 375/240.18, 375/240.19, 240.09
See application file for complete search history.

(56) References Cited

U.S. PATENT DOCUMENTS

| | | | |
|---|---|---|---|
| 6,314,452 B1* | 11/2001 | Dekel et al. ................. | 709/203 |
| 6,571,071 B2 | 5/2003 | Kanoshima et al. | |
| 6,674,982 B2 | 1/2004 | Saitoh et al. | |
| 6,898,323 B2* | 5/2005 | Schwartz et al. ........... | 382/240 |
| 2001/0050778 A1 | 12/2001 | Fukuda et al. | |
| 2002/0057850 A1* | 5/2002 | Sirohey et al. ............. | 382/299 |
| 2002/0159644 A1 | 10/2002 | Sakuyama | |
| 2003/0095272 A1 | 5/2003 | Nomizu | |
| 2003/0137695 A1 | 7/2003 | Nomizu | |
| 2004/0141651 A1 | 10/2003 | Hara et al. | |
| 2004/0078491 A1* | 4/2004 | Gormish et al. ............ | 709/247 |

OTHER PUBLICATIONS

U.S. Appl. No. 10/390,193, filed Mar. 14, 2003, Sakuyama.
U.S. Appl. No. 10/390,263, filed Mar. 14, 2003, Kodama.
U.S. Appl. No. 10/372,479, filed Feb. 21, 2003.
U.S. Appl. No. 10/348,444, filed Jan. 21, 2003, Nomizu.
U.S. Appl. No. 10/283,350, filed Oct. 30, 2002, Nomizu.
U.S. Appl. No. 10/082,308, filed Feb. 26, 2002, Sakuyama.
U.S. Appl. No. 09/847,192, filed May 2, 2001, Fukuda et al.
U.S. Appl. No. 09/725,569, filed Nov. 30, 2000, Namizuka et al.

(Continued)

*Primary Examiner*—Matthew C. Bella
*Assistant Examiner*—Claire Wang
(74) *Attorney, Agent, or Firm*—Oblon, Spivak, McClelland, Maier & Neustadt, P.C.

(57) ABSTRACT

An image processing apparatus includes a memory which stores a code stream having a wavelet division level, an interface unit which transmits the code stream to another apparatus, and a processing unit which changes the wavelet division level of the code stream before the transmission of the code stream to such another apparatus by acquiring a target division level that is a wavelet division level of such another apparatus, checking a difference between the target division level and the wavelet division level of the code stream, generating data that compensates for the difference, and embedding the generated data into the code stream.

10 Claims, 10 Drawing Sheets

OTHER PUBLICATIONS

U.S. Appl. No. 09/748,240, filed Dec. 27, 2000, Yoshizawa et al.
U.S. Appl. No. 09/748,262, filed Dec. 27, 2000, Namizuka et al.
U.S. Appl. No. 09/770,214, filed Jan. 29, 2001, Oteki et al.
U.S. Appl. No. 09/772,945, filed Jan. 31, 2001, Oteki et al.
U.S. Appl. No. 09/846,244, filed May 2, 2001, Shoji et al.
U.S. Appl. No. 09/855,665, filed May 16, 2001, Yamagata et al.
U.S. Appl. No. 09/912,364, filed Jul. 26, 2001, Sakuyama.
U.S. Appl. No. 09/940,589, filed Aug. 29, 2001, Inoue et al.
U.S. Appl. No. 09/964,584, filed Sep. 28, 2001, Shinkai et al.
U.S. Appl. No. 10/102,633, filed Mar. 22, 2002, Ameyama et al.
U.S. Appl. No. 10/156,093, filed May 29, 2002, Sano et al.
U.S. Appl. No. 10/164,545, filed Jun. 10, 2002, Sano et al.
U.S. Appl. No. 10/272,857, filed Oct. 18, 2002, Watanabe et al.
U.S. Appl. No. 10/379,533, filed Mar. 6, 2003, Takeyama et al.
U.S. Appl. No. 10/691,623, filed Oct. 24, 2003, Hara et al.
U.S. Appl. No. 10/986,781, filed Nov. 15, 2004, Matsuura et al.

* cited by examiner

Decomposition_Level_0

Decomposition_Level_1

Decomposition_Level_2

Decomposition_Level_3

MODIFYING WAVELET DIVISION LEVEL BEFORE TRANSMITTING DATA STREAM

BACKGROUND OF THE INVENTION

1. Field of the Invention

The present invention relates to an image processing apparatus, a program, and a memory medium using code data as image data where the code data is compressed and coded according to the JPEG2000 algorithm.

2. Description of the Related Art

In recent years, a demand for higher definition images has been on the increase due to the advancement of technology relating to image inputting/outputting. An example of an image scan apparatus is a digital camera. As the price goes down for high-performance charge coupled devices having three million or more pixels, such devices are now beginning to be used in digital cameras in the middle-price range. In the field of image outputting apparatus and image display apparatus, there has been a remarkable progress toward higher definition and lower prices in the making of hard copies by laser printers and inkjet printers. Such trend is also seen in the field of image forming apparatus such as a copier machine and multifunction peripherals (MFP).

Because of introduction of such high-performance and low-price products for image inputting/outputting into the market, high definition images are now beginning to be available to the masses. It is predicted that the demand for high-definition images will increase in any part of society.

Against this background, it is believed that there will be an increasing demand for compression and decompression technologies that enable the handy use of high-definition images. JPEG2000 is one of the image compression technologies that satisfy such demand. JPEG2000 allows a high-definition image to be divided into small parts for processing, and allows a high-quality image to be decoded even when a high-compression rate is used. One of the advantages of JPEG2000 is the use of the wavelet transform, which has an advantage of high image quality at high-compression rates. In the wavelet transform, the compression and decompression of a still image can be suspended at any desired level (decomposition level-1) of wavelet division, which corresponds to recursive octave division. This makes it possible to extract a low-resolution image (size-reduced image) and an image portion from a single file.

As for the construction of apparatus conforming to JPEG2000, a chip complying with the JPEG2000 specifications needs to be implemented as part of hardware. Each chip has a specified level of wavelet division that can be supported by its hardware.

Image processing apparatuses for processing image data often exchange the image data through networks. Such exchange is carried out between the same type of apparatuses (e.g., between digital cameras, between MFPs) or carried out between different types of apparatuses (e.g., between a personal computer and a digital camera, between a personal computer and an MFP).

As described above, the level of wavelet division that is supported by the JPEG2000 chip implemented in these apparatuses may be the same, or may differ from chip to chip. For example, image data (compressed and coded data) provided at a wavelet division level "10" may be transmitted to an MFP having a JPEG2000 chip supporting only up to a wavelet division level "5". In such a case, the hardware of the MFP cannot handle the wavelet division level "10", resulting in the need for the decoding of all the coded data for transmission of original image data. Time required for such transmission and processing is lengthy, and the load on the network is also considerable. In this manner, the advantage of the use of the JPEG2000 algorithm that compresses image data at high rate will be undermined.

The situation considered above also causes a trouble not only when the level of wavelet division at the receiver end is too low but also when it is too high. For example, an apparatus such as a digital camera or the like having hardware that supports the extraction of thumbnail images cannot extract a thumbnail image unless the wavelet division level matches that of the apparatus. For example, the wavelet division level of the apparatus may be "10", and the wavelet division level of the received data may be "5". Even in such case, the coded data at the wavelet division level "5" can be converted into the wavelet division level "10" through the wavelet transform, provided that a wavelet division level smaller than 10 is supported. However, processing time is required, thereby making it difficult to read a thumbnail image promptly. Moreover, if only the wavelet division level "10" is supported, it is necessary to decode the coded data of the wavelet division level "5" for retransmission as previously described.

Accordingly, there is a need for a scheme that matches a wavelet division level to that of hardware without decoding all the coded data when wavelet division levels supported by hardware differ between apparatuses.

SUMMARY OF THE INVENTION

It is a general object of the present invention to provide an image processing scheme that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an image processing apparatus and an image processing program particularly pointed out in the specification in such full, clear, concise, and exact terms as to enable a person having ordinary skill in the art to practice the invention.

To achieve these and other advantages in accordance with the purpose of the invention, the invention provides an image processing apparatus, includes a memory which stores a code stream having a wavelet division level, an interface unit which transmits the code stream to another apparatus, and a processing unit which changes the wavelet division level of the code stream before the transmission of the code stream to such another apparatus by acquiring a target division level that is a wavelet division level of such another apparatus, checking a difference between the target division level and the wavelet division level of the code stream, generating data that compensates for the difference, and embedding the generated data into the code stream.

The image processing apparatus described above generates data that compensates for the difference between the target division level and the wavelet division level of the code stream, and embeds the generated data into the code stream, thereby making the wavelet division level of the code stream conform to the target division level. This process can be done without decoding all the coded data, and the embedding of the compensation data makes it possible to transmit data in the code stream format without changing the format. A processing time and a transmission time are thus reduced.

According to another aspect of the invention, in response to the difference indicating the target division level lower than the wavelet division level of the code stream, the processing unit generates the data that compensates for the difference by reading coded data belonging to levels higher than the target division level, decoding the read coded data to obtain wavelet coefficients, performing inverse wavelet transform on the wavelet coefficients to generate LL component data, and encoding the LL component data.

In the image processing apparatus described above, when the target division level is lower than the wavelet division level of the code stream, the decoding, inverse wavelet transform, and coding of wavelet coefficients are performed for the level difference, thereby lowering the wavelet division level of the code stream. This makes it possible to transmit data in the code stream format without changing the format. A processing time and a transmission time are thus reduced.

According to another aspect of the invention, in response to the difference indicating the target division level higher than the wavelet division level of the code stream, the processing unit generates the data that compensates for the difference by reading coded data of an LL component belonging to a level lower than the target division level, decoding the read coded data of the LL component to obtain wavelet coefficients, performing wavelet transform on the wavelet coefficients to generate wavelet coefficients of the target division level, and encoding the wavelet coefficients of the target division level.

In the image processing apparatus described above, when the target division level is higher than the wavelet division level of the code stream, the decoding, further wavelet transform, and coding of an LL component are performed for the level difference, thereby raising the wavelet division level of the code stream. This makes it possible to transmit data in the code stream format without changing the format. The apparatus receiving the code stream can extract a thumbnail image or the like without additional load on hardware, thereby providing greater convenience.

According to another aspect of the invention, the processing unit changes a description of coding conditions stored in the code stream, the change in the description being responsive to the change in the wavelet division level of the code stream.

In the image processing apparatus described above, a description of coding conditions contained in the code stream is modified to reflect the change in the wavelet division level of the code stream. This provides for the apparatus receiving the code stream to properly cope with the change of the wavelet division level.

According to another aspect of the invention, the description of coding conditions is a description of a decomposition level number included in parameter SPcod regarding a coding style of components, which is part of a default coding style marker (COD) contained in the code stream.

In the image processing apparatus described above, a description of the decomposition level number included in parameter Spcod is changed in accordance with the change of the wavelet division level. This provides for the apparatus receiving the code stream to properly cope with the change of the wavelet division level.

According to another aspect of the invention, a computer-readable record medium having a program embodied therein for causing a computer to transmit a code stream having a wavelet division level to another apparatus is provided, wherein the program includes the steps of acquiring a target division level that is a wavelet division level of such another apparatus, checking a difference between the target division level and the wavelet division level of the code stream, generating data that compensates for the difference, and embedding the generated data into the code stream so as to change the wavelet division level of the code stream before the transmission of the code stream to such another apparatus.

The image processing apparatus described above generates data that compensates for the difference between the target division level and the wavelet division level of the code stream, and embeds the generated data into the code stream, thereby making the wavelet division level of the code stream conform to the target division level. This process can be done without decoding all the coded data, and the embedding of the compensation data makes it possible to transmit data in the code stream format without changing the format. A processing time and a transmission time are thus reduced.

According to another aspect of the invention, in response to the difference indicating the target division level lower than the wavelet division level of the code stream, the step of generating the data that compensates for the difference carries out reading coded data belonging to levels higher than the target division level, decoding the read coded data to obtain wavelet coefficients, performing inverse wavelet transform on the wavelet coefficients to generate LL component data, and encoding the LL component data to generate the data that compensates for the difference.

In the image processing apparatus described above, when the target division level is lower than the wavelet division level of the code stream, the decoding, inverse wavelet transform, and coding of wavelet coefficients are performed for the level difference, thereby lowering the wavelet division level of the code stream. This makes it possible to transmit data in the code stream format without changing the format. A processing time and a transmission time are thus reduced.

According to another aspect of the invention, in response to the difference indicating the target division level higher than the wavelet division level of the code stream, the step of generating the data that compensates for the difference carries out reading coded data of an LL component belonging to a level lower than the target division level, decoding the read coded data of the LL component to obtain wavelet coefficients, performing wavelet transform on the wavelet coefficients to generate wavelet coefficients of the target division level, and encoding the wavelet coefficients of the target division level to generate the data that compensates for the difference.

In the image processing apparatus described above, when the target division level is higher than the wavelet division level of the code stream, the decoding, further wavelet transform, and coding of an LL component are performed for the level difference, thereby raising the wavelet division level of the code stream. This makes it possible to transmit data in the code stream format without changing the format. The apparatus receiving the code stream can extract a thumbnail image or the like without additional load on hardware, thereby providing greater convenience.

According to another aspect of the invention, the program further includes a step of changing a description of coding conditions stored in the code stream, the change in the description being responsive to the change in the wavelet division level of the code stream.

In the image processing apparatus described above, a description of coding conditions contained in the code stream is modified to reflect the change in the wavelet division level of the code stream. This provides for the apparatus receiving the code stream to properly cope with the change of the wavelet division level.

According to another aspect of the invention, the description of coding conditions is a description of a decomposition level number included in parameter SPcod regarding a coding style of components, which is part of a default coding style marker (COD) contained in the code stream.

In the image processing apparatus described above, a description of the decomposition level number included in parameter Spcod is changed in accordance with the change of the wavelet division level. This provides for the apparatus receiving the code stream to properly cope with the change of the wavelet division level.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

[Outline of JPEG2000 Algorithm]

Embodiments of the invention utilize the JPEG2000 algorithm. Since the JPEG2000 algorithm is well known through various documents and publications, a description of the detail of the algorithm will not be given here, and only its outline will be described.

Figure 1:
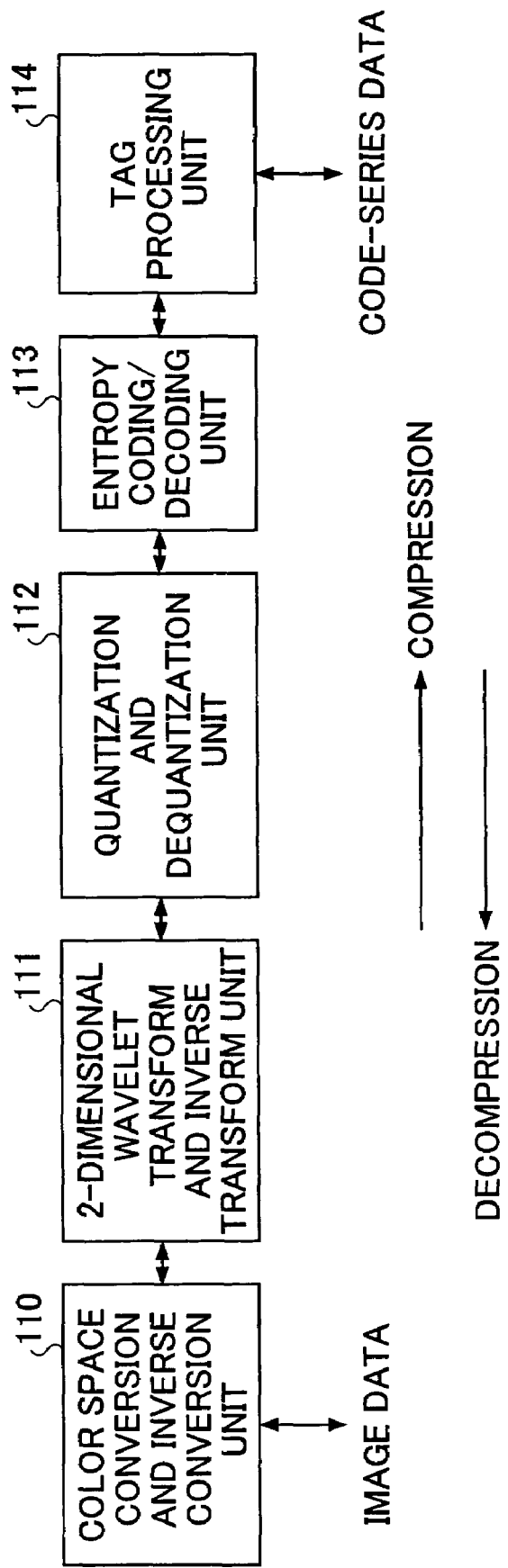
FIG. 1 is a block diagram for explaining the outline of the JPEG2000 algorithm.
Figure 2A:
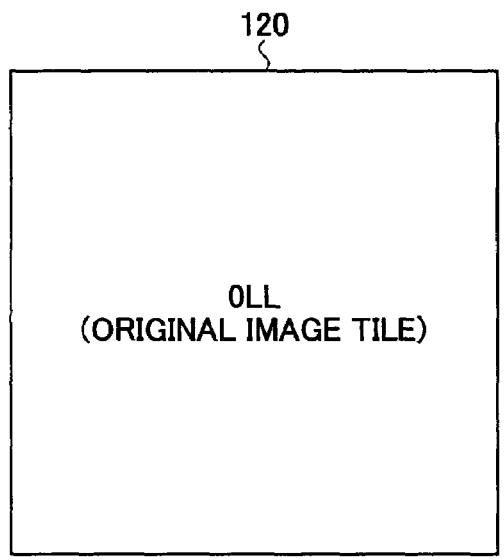
FIGS. 2A through 2D are drawings showing an example of sub-bands in each decomposition level in the case where the number of decomposition levels is equal to 3.
Figure 2B:
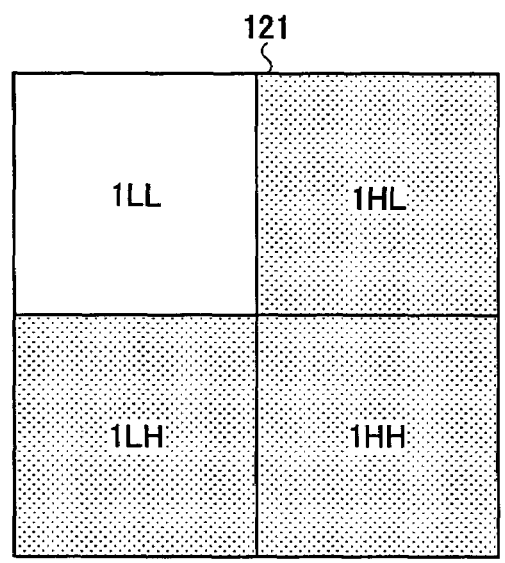
Figure 2C:
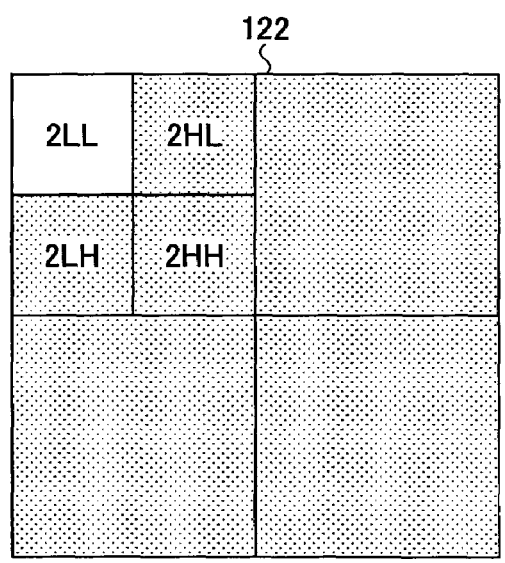
Figure 2D:
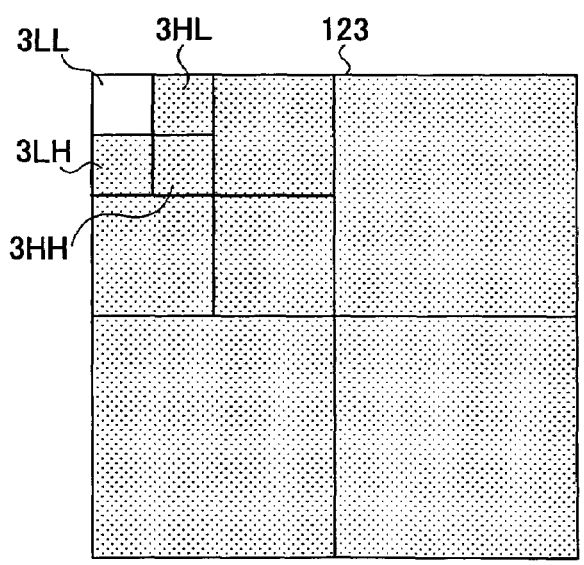

FIG. 1 is a block diagram for explaining the outline of the JPEG2000 algorithm. A construction for performing the JPEG2000 algorithm includes a color space conversion and inverse conversion unit 110, a 2-dimensional wavelet transform and inverse transform unit 111, a quantization and dequantization unit 112, an entropy coding/decoding unit 113, and a tag processing unit 114.

One of the features of the JPEG2000 algorithm is the use of 2-dimensional discrete wavelet transform (DWT: discrete wavelet transform), which has an advantage of providing high image quality in the highly compressed region as described above. A further significant feature is the provision of the tag processing unit 114 as a last-stage functional block for forming codes, which enables generation and analysis of code streams. Based on the code streams, JPEG2000 can provide various convenient functions.

FIGS. 2A through 2D are drawings showing an example of sub-bands in each decomposition level in the case where the number of the decomposition levels (wavelet division level+1) is equal to 3. The compression and decompression of a still image can be suspended at a desired level in the hierarchy corresponding to octave divisions of the block-base DWT shown in FIGS. 2A through 2D.

At a portion for inputting/outputting of an original image, the color space conversion and inverse conversion unit 110 is typically provided. This portion performs conversion and inverse conversion with respect to the RGB color system comprised of R(red), G(green), and B(blue) components that are primary colors or the YMC color system comprised of Y(yellow), M(magenta), and C(cyan) components that form a complement color system, thereby achieving conversion into or inverse conversion from the YCrCb or YUV color system.

In the following, a description will be given of the JPEG2000 algorithm by focusing on the wavelet transform.

At the time of coding, the color space conversion unit 110 receives the data of each tile of each component and performs color space conversion. The 2-dimensional wavelet transform unit 111 then carries out the 2-dimensional wavelet transform (forward conversion) to divide the space into frequency bands.

In FIGS. 2A through 2D, sub-bands are shown for each decomposition level when the number of decomposition level is 3. An original tile image (0LL) (decomposition level 0 indicated by reference number 120) that is obtained by the tile division of an original image is subjected to the 2-dimensional wavelet transform, thereby separating sub-bands (1LL, 1HL, 1LH, 1HH) shown at the decomposition level 1 (indicated by reference number 121). Following this, the low frequency components 1LL in this hierarchy is subjected to the 2-dimensional wavelet transform, thereby separating sub-bands (2LL, 2HL, 2LH, 2HH) shown at the decomposition level 2 (indicated by reference number 122). Subsequently, the 2-dimensional wavelet transform is again performed with respect to the low frequency components 2LL, thereby separating sub-bands (3LL, 3HL, 3LH, 3HH) shown at the decomposition level 3 (indicated by reference number 123).

In FIGS. 2A through 2D, the sub bands that are to be coded at each decomposition level are illustrated in the gray halftone. When the decomposition level is 3, for example, the sub bands (3HL, 3LH, 3HH, 2HL, 2LH, 2HH, 1HL, 1LH, 1HH) shown in the gray halftone are subjected to a coding process, and the sub-band 3LL is excluded from the coding process.

In predetermined order for coding, bits to be coded are selected, and the quantization unit 112 generates contexts from surrounding bits that are located around the selected bit. Wavelet coefficients obtained after the quantization process are divided into non-overlapping rectangular areas separately for each sub-band. The wavelet transform coefficients can be quantized and coded. In order to improve coding efficiency, however, the JPEG 2000 decomposes the coefficients on a bit-plane-by-bit-plane basis. The bit-planes are then numbered with respect to each pixel or each code block.

The entropy coding unit 113 encodes the tiles of each component by applying probability estimation to the contexts and the selected bit. In this manner, all the components of the original image are coded on a tile-by-tile basis. At the end, the tag processing unit 114 consolidates all the coded data supplied from the entropy coding unit into a single code stream, and adds tags to this code stream.

Figure 3:
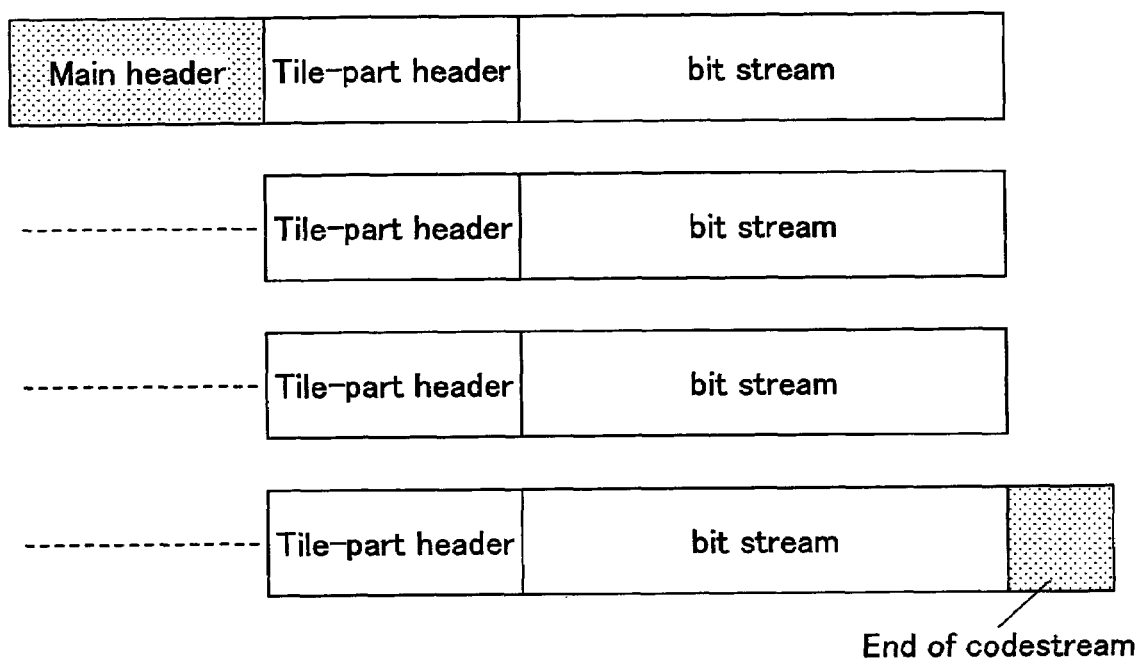
FIG. 3 is an illustrative drawing showing the structure of a code stream.

FIG. 3 is an illustrative drawing showing the structure of a code stream. Tag information called "header" is attached to the beginning of a code stream and also to the beginning of each tile part that constitutes a corresponding tile. The coded data of each tile follows the header. At the end of the code stream is provided another tag.

At the time of decoding, image data is generated from the code stream of each tile of each component in a manner reverse to the coding process. In this case, the tag processing unit 114 interprets the tag information attached to the code stream that is input from the exterior, and decomposes the code stream into code streams of individual tiles of each component. Decoding is performed with respect to each of the code streams of individual tiles of each component. The position of a bit that is to be decoded is determined in such order as determined according to the tag information in the code stream. The dequantization unit 112 then generates contexts from the surrounding bits (that have already been decoded) around the selected bit position. The entropy decoding unit 113 generates the selected bit by decoding the code streams through probability estimation based on the contexts. The generated bit is inserted into the selected bit position.

The data decoded in this manner is provided in a format having divided spaces corresponding to respective frequency bands. The 2-dimensional inverse wavelet transform unit 111 performs the 2-dimensional inverse wavelet transform to reconstruct each tile of each component of the image data. The reconstructed data is converted into data of the original color system by the color space inverse conversion unit 110.

Heretofore, a description of the outline of the JPEG2000 algorithm has been given.

[Image Processing Apparatus]

Figure 4:
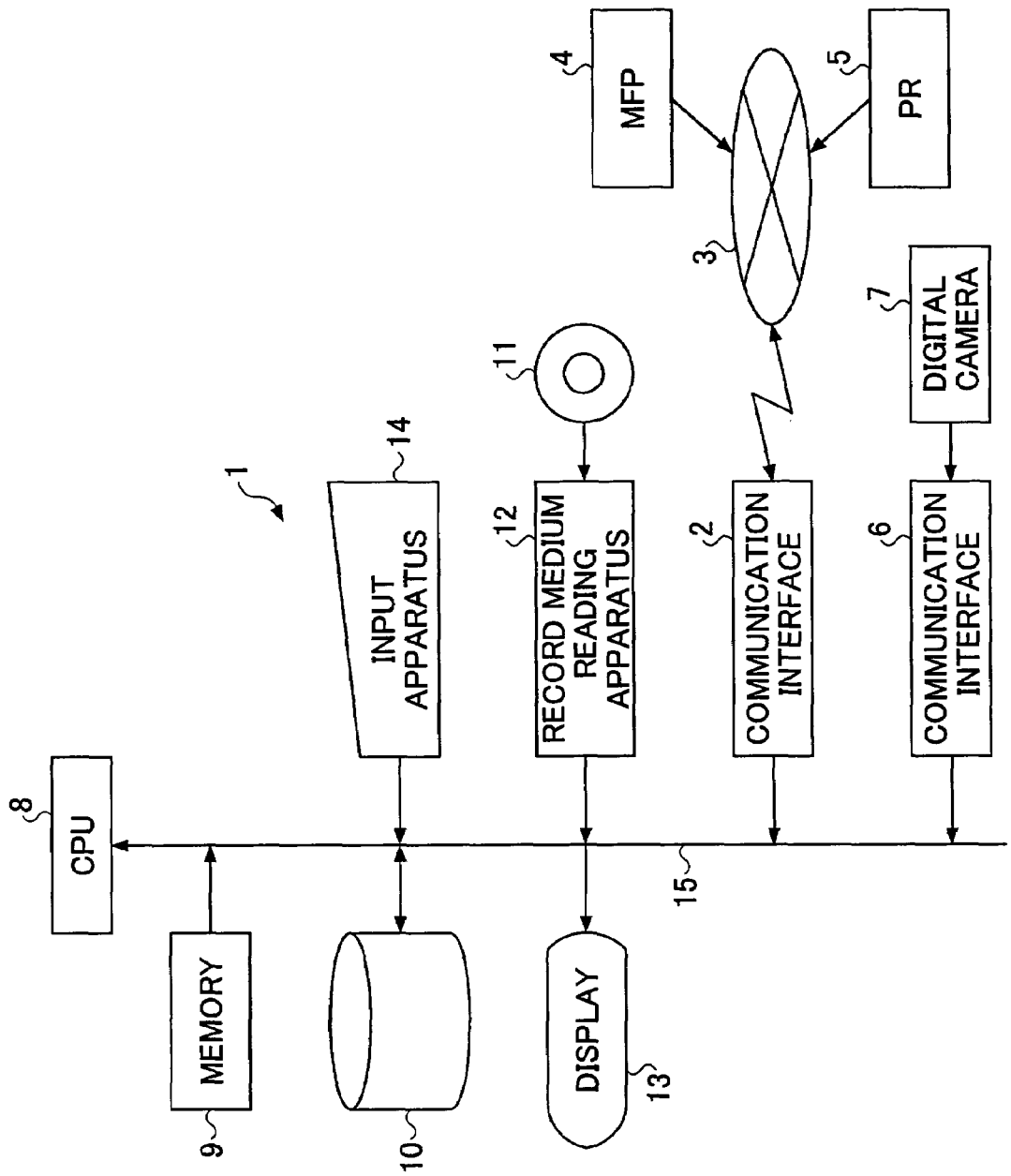
FIG. 4 is a block diagram showing a schematic hardware construction of an image processing apparatus to which the invention is applied.

FIG. 4 is a block diagram showing a schematic hardware construction of an image processing apparatus 1 to which the invention is applied. As shown in FIG. 4, the image processing apparatus 1 to which the invention is applied is a personal computer, for example, and is connectable to an MFP 4, a printer 5, and the like through a communication interface 2 and a network 3. The image processing apparatus 1 is also connectable to a digital camera 7 through the communication interface 6 (e.g., RS232C).

The image processing apparatus 1 that is a personal computer in this embodiment includes a CPU (central processing unit) 8 for processing information, a memory 9 such as a ROM (read only memory) and a RAM (random access memory) for storing information, an HDD (hard disk drive) 10 for storing image data such as compressed codes and other data, a record medium reading apparatus 12 for accessing a record medium 11 for use in storing information, distributing information, and receiving information, a display 13 such as a CRT (cathode ray tube) or an LCD (liquid crystal display) for displaying the progress of processes and the results of processes to an operator, and an input apparatus 14 such as a keyboard and a mouse for use by the operator to provide instructions and information to the CPU 8. A bus controller 15 arbitrates the exchange of data between these units.

In the image processing apparatus 1, the CPU 8 executes a program called a loader stored in the ROM when a user turns on the power, and loads operating system programs from the HDD 10 to the ROM for controlling the hardware and software of the computer, followed by starting the operating system. The operating system starts programs, reads information, and stores information according to user operations. Typical examples of such operating system include Windows (registered trademark), UNIX (registered trademark), etc. Programs that are run on the operating system are referred to as application programs.

The image processing apparatus 1 has an image processing program stored in the HDD 10 as an application program. In this regard, the HDD 10 functions as a memory medium for storing the image processing program.

In general, programs installed in the HDD 10 of the image processing apparatus 1 are provided by the record medium 11 such as an optical record medium like a CD-ROM or a DVD-ROM and a magnetic record medium like a FD, in which these programs are recorded. The record medium 11 such as an optical record medium like a CD-ROM and a magnetic record medium like a FD, which are exchangeable, can properly referred to as a record medium. The image processing program may be provided from an exterior through the communication interface 2 for installation in the HDD 10.

In the image processing apparatus 1, the image processing program runs on the operating system, and the CPU 8 executes various operations according to the image processing program, thereby centrally controlling various units.

[Wavelet Division Level]

A chip complying with the JPEG2000 specification for compressing and decompressing image data according to the JPEG2000 algorithm as shown in FIG. 1 is implemented as a hardware component in each of the image processing apparatus 1, the MFP 4, the printers 5, and the digital camera 7, etc. These units are thus able to handle code streams that are compressed and encoded as image data. Wavelet division levels supported by the chips complying with the JPEG2000 specification may be the same, or may vary from chip to chip.

In this embodiment, the wavelet division level supported by the hardware of the image processing apparatus 1 differs from the wavelet division level supported by the hardware of the other apparatus such as the MFP 4 when image data is exchanged between these apparatuses.

In the following, a description will be given of a case in which the wavelet division level of a code stream that matches the specification of the MFP 4 is lower than the wavelet division level of a code stream of the image processing apparatus 1.

Figure 5:
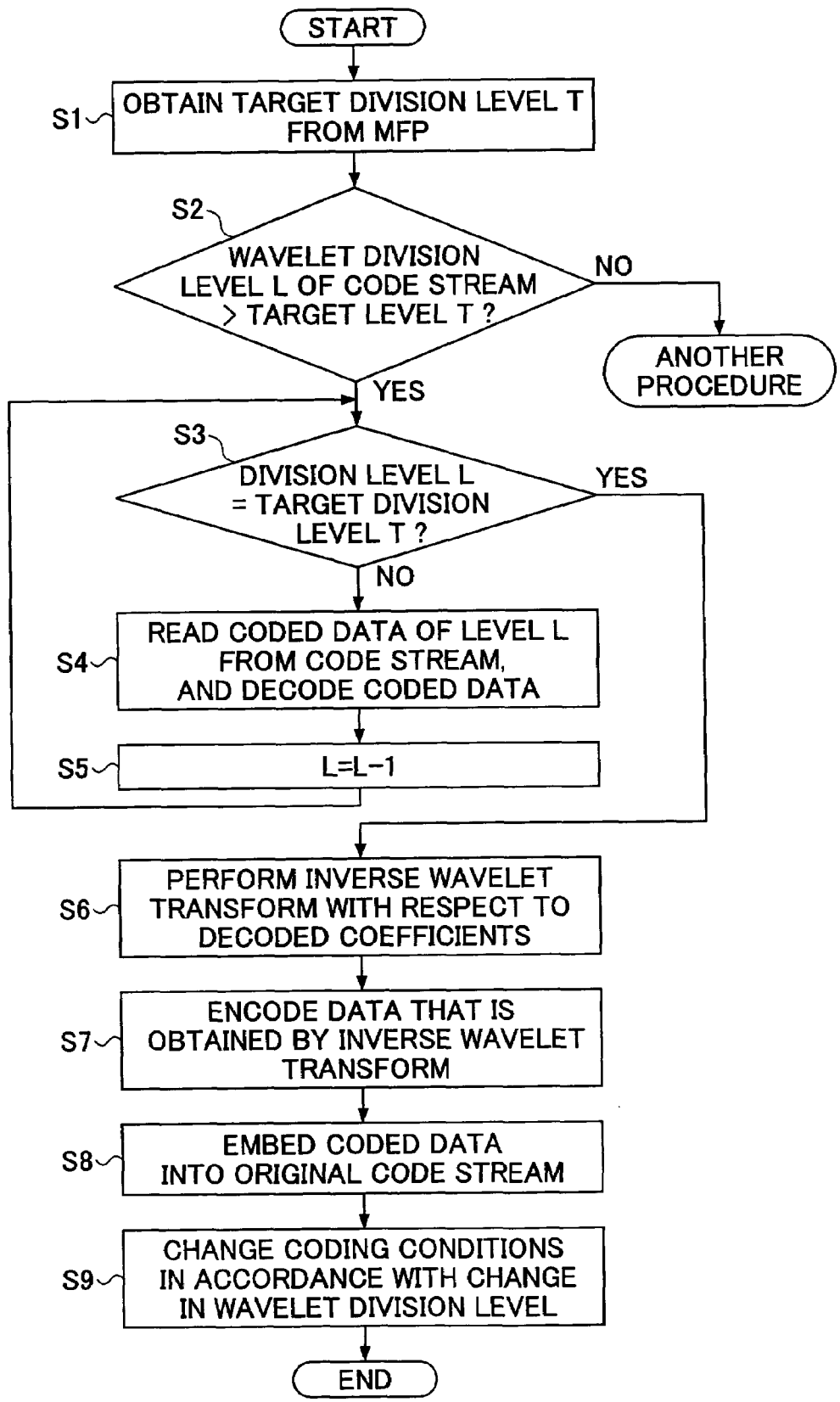
FIG. 5 is a flowchart showing a method of processing control that is performed when the wavelet division level of a destination apparatus is lower than the wavelet division level of a code stream to be transmitted.

An example of processing control for such a case will be described with reference to FIG. 5 through FIG. 7. Before transmitting image data from the image processing apparatus 1 to the MFP 4, the wavelet division level of code streams that match the specification of the MFP 4 is acquired as a target division level T (step S1). Then, a wavelet division level L of image data (i.e., a compressed and encoded code stream) that is to be transmitted from the image processing apparatus 1 is identified, and a level difference between the target division level T and the wavelet division level L is checked (step S2). If the check finds that the target division level T is lower than the wavelet division level L as supposed to be so in this example (Y at S2), coded data belonging to levels higher than the target division level T are successively read from the code stream for decoding into wavelet coefficients until the level matches the target division level T (S4, S5, and Y at S3).

Figure 6:
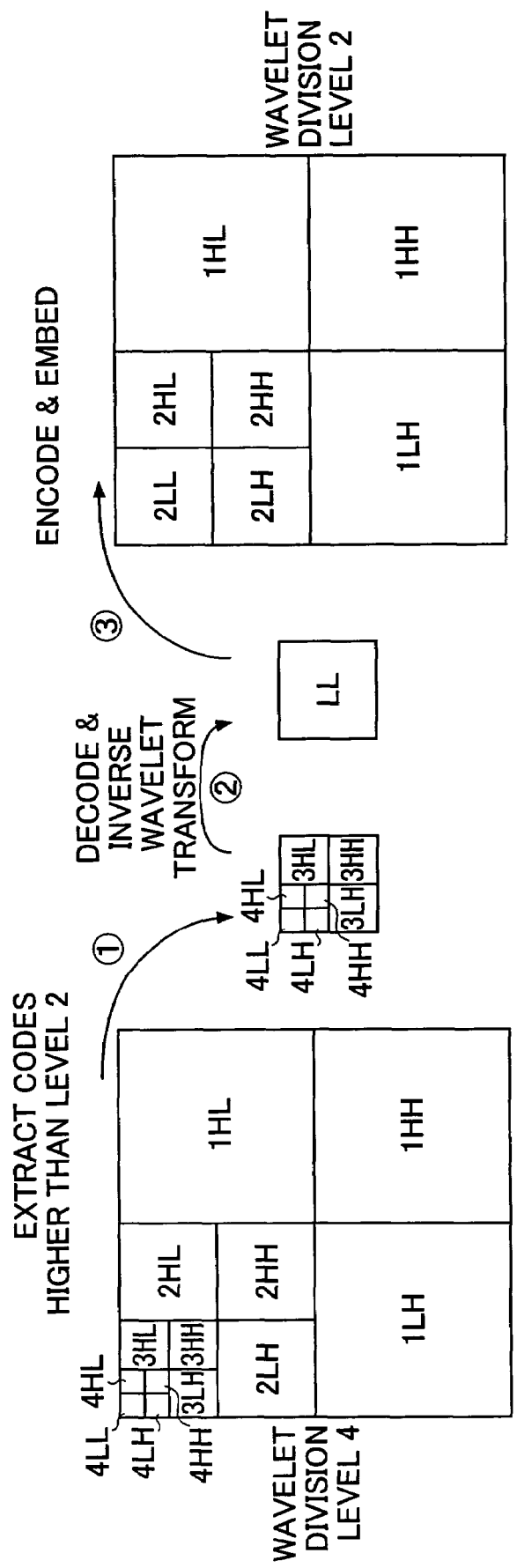
FIG. 6 is an illustrative drawing showing steps for lowering a wavelet division level.

If L=4 and T=2, for example, as illustrated in FIG. 6, the code data of 3HH, 3HL, 3LH, 4HH, 4HL, 4LH, and 4LL components having a level higher than the target division level T=2 are read from the code stream (process (1)).

The wavelet coefficients that are decoded after reading from the code stream are subjected to the inverse wavelet transform, thereby generating the data of the LL component that belongs to the target division level T=2 (S6). In the example shown in FIG. 6, the coded data of 3HH, 3HL, 3LH, 4HH, 4HL, 4LH, and 4LL components are decoded and then subjected to the inverse wavelet transform, thereby generating the data of the LL component (process (2)).

The data of the LL component generated by the inverse wavelet transform is then coded (S7), and the coded data of the LL component is embedded into the original code stream so as to lower the wavelet division level of the code stream (S8). In the example of FIG. 6, the LL component generated as described above is embedded into the highest level of the code stream as the 2LL component that is the LL component of the target division level T=2 (process (3)).

Figure 7:
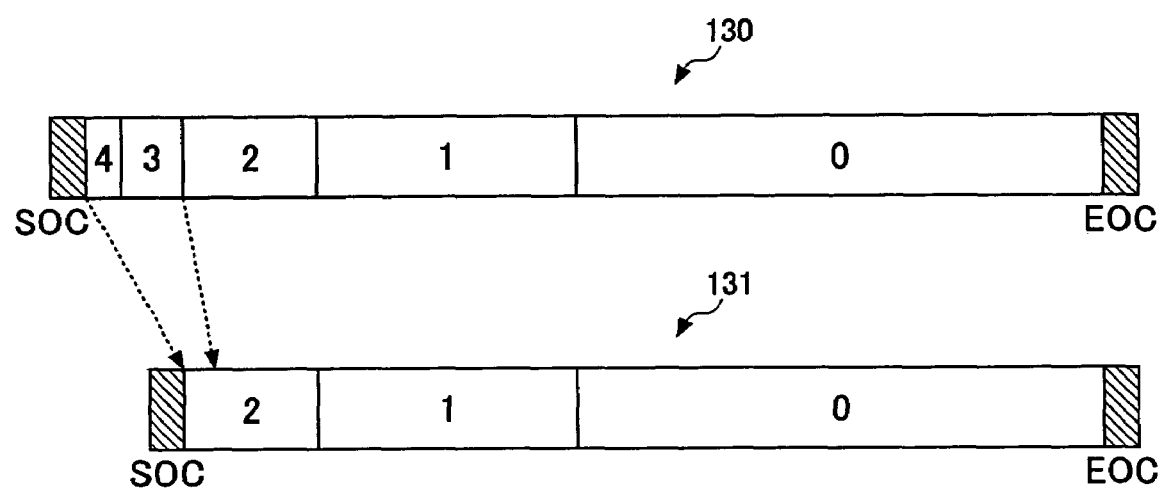
FIG. 7 is an illustrative drawing showing the lowering of the wavelet division level in code-stream representation.

According to code-stream representation, the change of state is made as illustrated in FIG. 7 from wavelet division level 4 as designated by 130 to wavelet division level 2 as designated by 131. In FIG. 7, "SOC" is the start marker of the code stream, and "EOC" is the end marker of the code stream.

Coding conditions are then changed together with the change of the wavelet division level after the embedding as described above (S9). To be specific, a description of the decomposition level number (NL) is changed from 5 to 3, for example, in parameter SPcod regarding the coding style of components, which is included in the default coding style marker (COD) of the code-stream start marker SOC.

The image processing apparatus 1 transmits the code stream having the changed level to the MFP 4.

In this manner, the decoding and coding of data corresponding to only levels that are not supported by the hardware of the MFP 4 changes a code stream in the image processing apparatus 1, such that the changed code stream is supported by the hardware of the MFP 4. As a result, data can be transmitted in the code stream format, without a need to decode all images until an original image is obtained for transmission of the original image. On the side of the MFP 4, JPEG-2000 data having the wavelet division level 4 can be handled without imposing the excess load on the network 3 or the like even when the MFP 4 supports only the wavelet division level 2.

Figure 8:
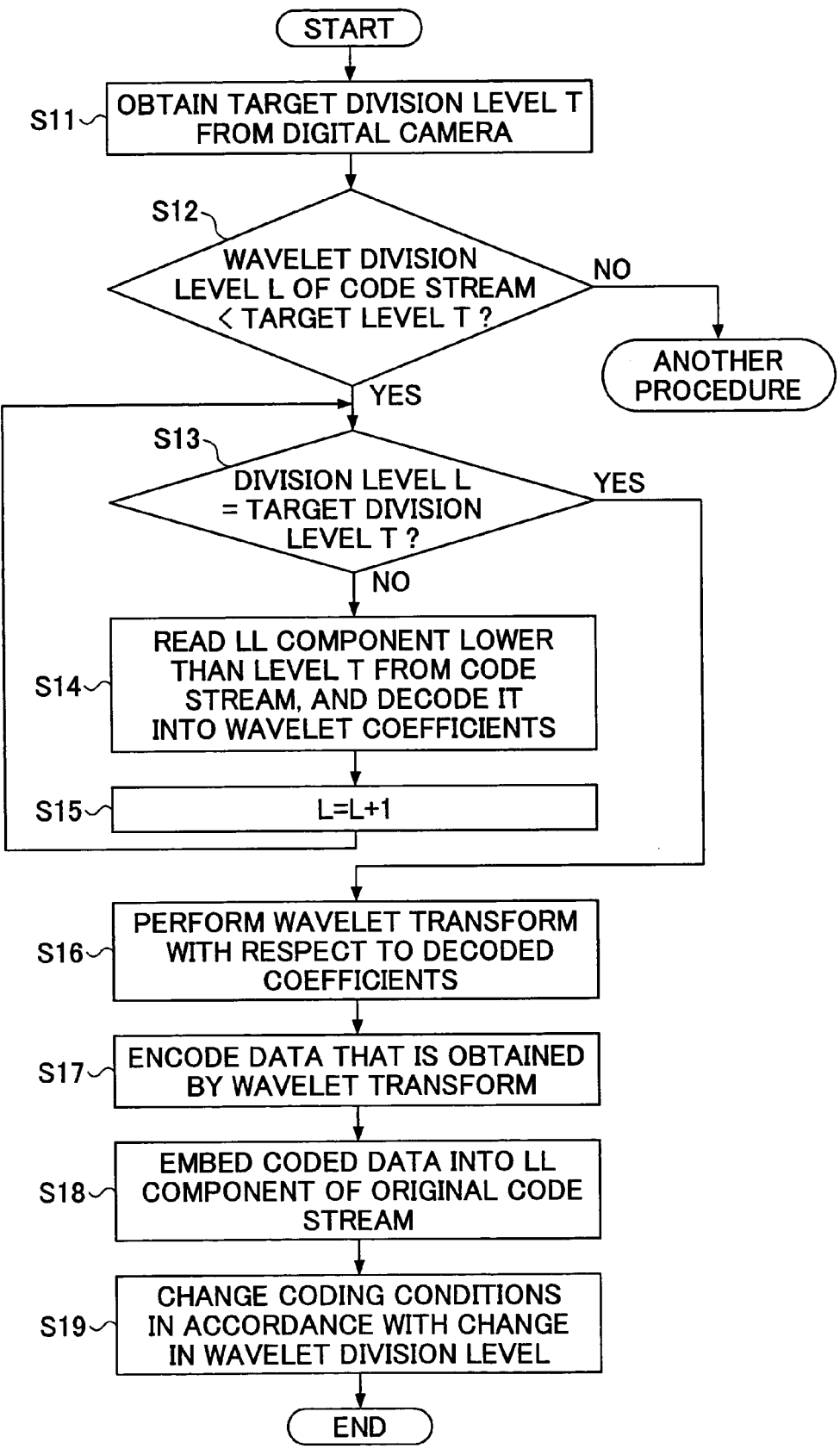
FIG. 8 is a flowchart showing a method of processing control that is performed when the wavelet division level of a destination apparatus is higher than the wavelet division level of a code stream to be transmitted.

In the following, a description will be given of a case in which the wavelet division level (target division level) of a code stream that matches the specification of the digital camera 7 is higher than the wavelet division level of a code stream of the image processing apparatus 1. An example of processing control in such a case will be described with reference to FIG. 8 through FIG. 10. Before transmitting image data from the image processing apparatus 1 to the digital camera 7, the wavelet division level of code streams that match the specification of the digital camera 7 is acquired as a target division level T (step S11). Then, a wavelet division level L of image data (i.e., a compressed and encoded code stream) that is to be transmitted from the image processing apparatus 1 is identified, and a level difference between the target division level T and the wavelet division level L is checked (step S12). If the check finds that the target division level T is higher than the wavelet division level L as supposed to be so in this example (Y at S12), the coded data of an LL component belonging to a level lower than the target division level T is read from the code stream for decoding into wavelet coefficients until the level matches the target division level T (S14, S15, and Y at S13).

Figure 9:
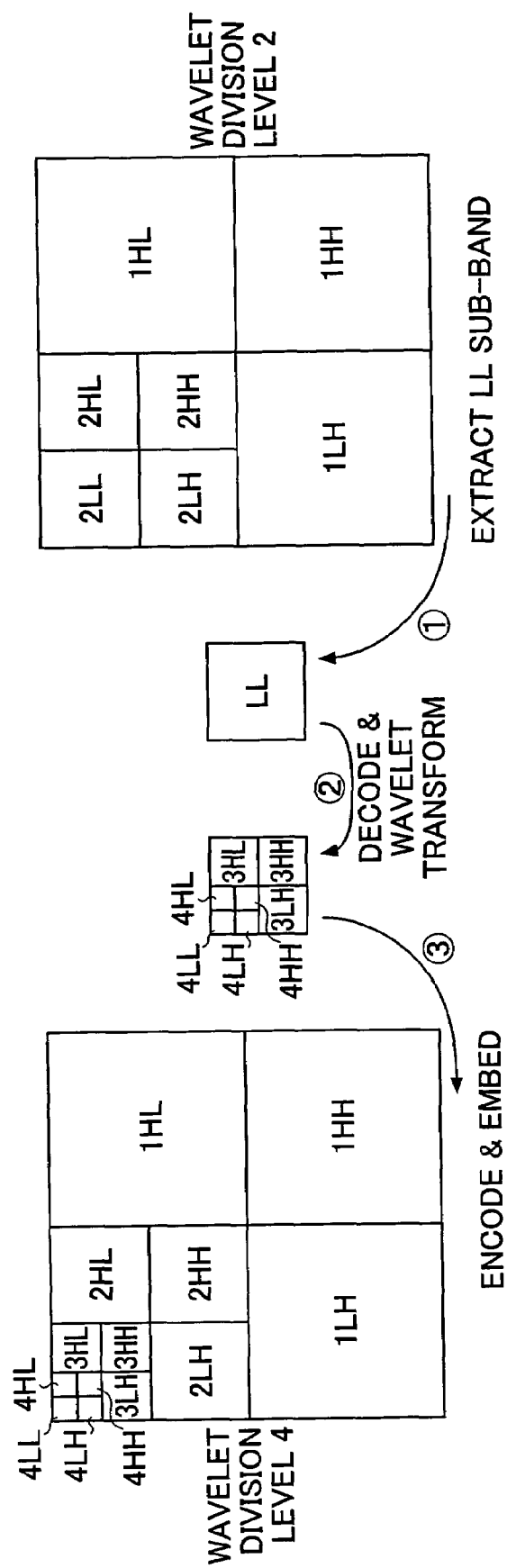
FIG. 9 is an illustrative drawing showing steps for raising a wavelet division level.

If L=2 and T=4, for example, as illustrated in FIG. 9, the coded data of the 2LL component at a level lower than the target division level T=4 is read from the code stream (process (1)).

The wavelet coefficients that are decoded after reading from the code stream are subjected to the wavelet transform, thereby generating data that belongs to the target division level T=4 (S16). In the example shown in FIG. 9, two stages of the wavelet transform are applied to the data of the 2LL component so as to provide the wavelet coefficients of 3HH, 3HL, 3LH, 4HH, 4HL, 4LH, and 4LL components (process (2)).

The wavelet coefficients generated by the wavelet transform are then coded (S17), and the coded data is embedded into the code stream in place of the original 2LL component so as to raise the wavelet division level of the code stream (S18). In the example of FIG. 9, the coded data of the 3HH, 3HL, 3LH, 4HH, 4HL, 4LH, and 4LL components generated as described above is embedded into the highest level of the code stream to replace the 2LL component (process (3)).

Figure 10:
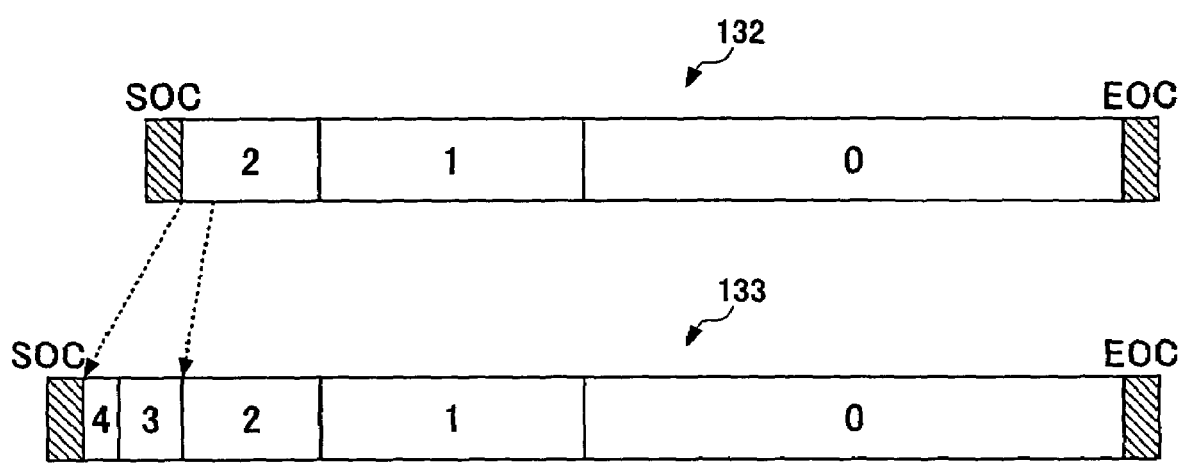
FIG. 10 is an illustrative drawing showing the raising of the wavelet division level in code-stream representation.

According to code-stream representation, the change of state is made as illustrated in FIG. 10 from wavelet division level 2 as designated by 132 to wavelet division level 4 as designated by 133.

Coding conditions are then changed together with the change of the wavelet division level after the embedding as described above (S19). To be specific, a description of the decomposition level number (NL) is changed from 3 to 5, for example, in parameter SPcod regarding the coding style of components, which is included in the default coding style marker (COD) of the code-stream start marker SOC.

The image processing apparatus 1 transmits the code stream having the changed level to the digital camera 7.

The digital camera 7 having a higher wavelet division level will have difficulty extracting a thumbnail image if the data has a wavelet division level lower than that conforming to the digital camera 7. The LL component of a lower level is subjected to further wavelet transform for coding in the image processing apparatus 1 serving as a transmission source, and is embedded into the original code stream, thereby changing the wavelet division level of the code stream. This provides a match with the wavelet division level of the digital camera 7. The digital camera 7 is thus able to display a thumbnail image without any additional processing based on the code stream transmitted from the image processing apparatus 1. The difference in the wavelet division levels is thus properly handled.

The above embodiments have been described with reference to an example in which the image processing apparatus 1 is a personal computer. It should be noted that the image processing apparatus may be any apparatus as long as it handles image data. It should also be noted that the present invention is applicable to the case of wavelet division levels varying between the same type of apparatuses as well as the case of wavelet division levels varying between different types of apparatuses.

Further, the present invention is not limited to these embodiments, but various variations and modifications may be made without departing from the scope of the present invention.

The present application is based on Japanese priority application No. 2002-310506 filed on Oct. 25, 2002, with the Japanese Patent Office, the entire contents of which are hereby incorporated by reference.

What is claimed is:

1. An image processing apparatus that transmits image data from a second device to a first device, comprising:
   acquisition means for acquiring a target division level that is a wavelet division level supported by the first device;
   checking means for checking a difference between the target division level and a wavelet division level in an original code stream of the second device, wherein said original code stream is compressed and encoded according to a JPEG 2000 algorithm;
   reading means for reading coded data responsive to a check result of the checking means from the original code stream;
   decoding means for decoding wavelet coefficients from the coded data read by the reading means;
   generating means for generating LL component data of the target division level by performing a wavelet transform or an inverse wavelet transform on the wavelet coefficients decoded by the decoding means;
   coding means for coding the LL component data generated by the generating means;
   changing means for changing the wavelet division level of the original code stream by embedding, in the original code stream of the second device, the LL component data coded by the coding means for transmission to the first device; and
   coding condition changing means for changing coding conditions in the original code stream based on the wavelet division level changed by the changing means.

2. The image processing apparatus as claimed in claim 1, wherein if the target division level is low, the reading means reads coded data of levels higher than the target division level from the original code stream.

3. The image processing apparatus as claimed in claim 1, wherein if the target division level is high, the reading means reads coded data of an LL component of a level lower than the target division level from the original code stream.

4. The image processing apparatus as claimed in claim 1, wherein the coding conditions are a decomposition level number in a parameter regarding a coding style of components included in a default coding style marker (COD) in a start marker (SOC) of the original code stream.

5. The image processing apparatus as claimed in claim 2, wherein the coding conditions are a decomposition level number in a parameter regarding a coding style of components included in a default coding style marker (COD) in a start marker (SOC) of the original code stream.

6. A method for transmitting image data from a second device to a first device, said method comprising the steps of:
   acquiring a target division level that is a wavelet division level supported by the first device;
   checking a difference between the target division level and a wavelet division level in an original code stream of the second device, wherein said original code stream is compressed and encoded according to a JPEG 2000 algorithm;
   reading coded data responsive to a check result of the checking step from the original code stream;
   decoding wavelet coefficients from the read coded data;
   generating LL component data of the target division level by performing a wavelet transform or an inverse wavelet transform on the decoded wavelet coefficients;
   coding the generated LL component data;
   changing the wavelet division level of the original code stream by embedding, in the original code stream of the second device, the coded LL component data for transmission to the first device; and
   changing coding conditions in the original code stream based on the changed wavelet division level.

7. The method as claimed in claim 6, wherein if the target division level is low, the step of reading coded data includes reading coded data of levels higher than the target division level from the original code stream.

8. The method as claimed in claim 6, wherein if the target division level is high, the step of reading coded data includes reading coded data of an LL component of a level lower than the target division level from the original code stream.

9. The method as claimed in claim 6, wherein the coding conditions are a decomposition level number in a parameter regarding a coding style of components included in a default coding style marker (COD) in a start marker (SOC) of the original code stream.

10. The method as claimed in claim 7, wherein the coding conditions are a decomposition level number in a parameter regarding a coding style of components included in a default coding style marker (COD) in a start marker (SOC) of the original code stream.

* * * * *